United States Patent
Milojkovic

(10) Patent No.: US 11,936,435 B2
(45) Date of Patent: Mar. 19, 2024

(54) SYSTEMS AND METHODS FOR COMBINATION TELECOMMUNICATIONS AND POWER NETWORKS

(71) Applicant: Aleksandar Milojkovic, Vancouver (CA)

(72) Inventor: Aleksandar Milojkovic, Vancouver (CA)

( * ) Notice: Subject to any disclaimer, the term of this patent is extended or adjusted under 35 U.S.C. 154(b) by 0 days.

(21) Appl. No.: 18/270,593

(22) PCT Filed: Jul. 12, 2022

(86) PCT No.: PCT/CA2022/051083
§ 371 (c)(1),
(2) Date: Jun. 30, 2023

(87) PCT Pub. No.: WO2023/178408
PCT Pub. Date: Sep. 28, 2023

(65) Prior Publication Data
US 2024/0063920 A1    Feb. 22, 2024

Related U.S. Application Data

(60) Provisional application No. 63/322,721, filed on Mar. 23, 2022.

(51) Int. Cl.
*H04B 10/80*     (2013.01)
*H02J 7/02*      (2016.01)
(Continued)

(52) U.S. Cl.
CPC ............ *H04B 10/806* (2013.01); *H02J 7/02* (2013.01); *H04B 10/27* (2013.01);
(Continued)

(58) Field of Classification Search
CPC .... H04B 10/806; H04B 10/27; H04B 10/272; H04B 10/80; H04B 10/808; H02J 7/02;
(Continued)

(56) References Cited

U.S. PATENT DOCUMENTS 7,359,647 B1 *  4/2008  Faria ................. H04B 10/807
                                                    455/343.1
10,516,761 B1 * 12/2019  A ........................ H04L 41/12
(Continued)

FOREIGN PATENT DOCUMENTS

WO        2020191244 A1    9/2020

OTHER PUBLICATIONS

Okrasinski, T.A. et al., "Energy Management and the Environment", AT&T Technical Journal, vol. 74, No. 6, pp. 44-52, Nov./Dec. 1995.

*Primary Examiner* — Dibson J Sanchez
(74) *Attorney, Agent, or Firm* — McMillan LLP

(57) ABSTRACT

Herein is disclosed a combined telecommunications and power network, the network comprising: one or more optical network terminals; one or more optical network splitters, wherein each of the optical network splitters are optically connected to one or more of the optical network terminals; one or more optical line terminals, wherein each of the optical line terminals are optically connected to one or more of the optical network splitters; one or more network switches, wherein each of the network switches are connected to one or more of the optical line terminals; one or more routers, wherein each of the routers are connected to one or more of the network switches, and electrically connected to one or more modems; one or more automatic transfer switches, wherein each of the automatic transfer switches electrically powers one or more of the optical line terminals; one or more power sources, wherein each of the power sources is electrically connected to a respective one of the automatic transfer switches; and a server system, (Continued)

wherein the server system is in communication with one or more of: one or more of the network switches and one or more of the optical network terminals.

37 Claims, 5 Drawing Sheets

(51) Int. Cl.
    *H04B 10/27*           (2013.01)
    *G06F 16/901*         (2019.01)
    *H02J 9/00*             (2006.01)
    *H04B 10/272*         (2013.01)
    *H04J 14/02*           (2006.01)
    *H04Q 11/00*          (2006.01)

(52) U.S. Cl.
    CPC ............. *G06F 16/9024* (2019.01); *H02J 9/00* (2013.01); *H02J 2207/20* (2020.01); *H04B 10/272* (2013.01); *H04B 10/80* (2013.01); *H04B 10/808* (2013.01); *H04J 14/0245* (2013.01); *H04J 14/0249* (2013.01); *H04Q 11/0067* (2013.01); *H04Q 2011/0096* (2013.01); *Y02B 10/70* (2013.01)

(58) Field of Classification Search
    CPC ..... H02J 2207/20; H02J 9/00; G06F 16/9024; H04J 14/0245; H04J 14/0249; H04Q 11/0067; H04Q 2011/0096; Y02B 10/70
    USPC .................... 398/43–103, 140–172
    See application file for complete search history.

(56) References Cited

U.S. PATENT DOCUMENTS

| | | | | |
|---|---|---|---|---|
| 11,211,817 B1* | 12/2021 | Lu | ............................ | H02J 9/062 |
| 2007/0177872 A1* | 8/2007 | Gadkari | .............. | H04J 14/0238 398/58 |
| 2008/0159744 A1* | 7/2008 | Soto | ..................... | H04B 10/808 398/115 |
| 2008/0168283 A1* | 7/2008 | Penning | .................. | H04L 41/00 713/310 |
| 2008/0240367 A1* | 10/2008 | Wynman | .............. | H04B 10/808 398/2 |
| 2009/0044240 A1* | 2/2009 | Sniezko | .............. | H04L 12/2801 725/111 |
| 2009/0087181 A1* | 4/2009 | Gray | ........................ | H04L 12/10 398/43 |
| 2009/0232498 A1* | 9/2009 | Tsuge | ................... | H04L 41/0226 398/58 |
| 2010/0020690 A1* | 1/2010 | Komiya | .............. | H04L 12/1881 370/235 |
| 2010/0046945 A1* | 2/2010 | Lee | ........................ | H04J 14/025 398/68 |
| 2010/0103943 A1* | 4/2010 | Walter | ................ | H04L 12/2898 370/419 |
| 2010/0247098 A1* | 9/2010 | Nesset | ............... | H04Q 11/0067 398/58 |
| 2012/0120314 A1* | 5/2012 | Yang | ..................... | H04N 17/004 348/E9.034 |
| 2012/0195589 A1* | 8/2012 | Nors | ........................ | H04L 45/28 398/5 |
| 2013/0287396 A1* | 10/2013 | Cavaliere | ............ | H04J 14/0238 398/48 |
| 2015/0016247 A1* | 1/2015 | Hayes | .................. | H04L 47/127 370/230 |
| 2015/0303740 A1* | 10/2015 | Maguire | ............... | H04B 10/272 307/66 |
| 2017/0033564 A1* | 2/2017 | Lin | ........................ | H02J 7/0068 |
| 2017/0214984 A1* | 7/2017 | Roe | ..................... | H04Q 11/0067 |
| 2018/0062746 A1* | 3/2018 | Ohteru | ................ | H04B 10/03 |
| 2018/0081943 A1* | 3/2018 | Johnson | ............... | G06F 16/2477 |
| 2018/0210966 A1* | 7/2018 | Bedi | ................... | G06F 16/9024 |
| 2019/0289374 A1* | 9/2019 | Vilella | ................ | H04Q 11/0067 |
| 2020/0343975 A1* | 10/2020 | Deng | .................... | H04B 10/272 |
| 2021/0013735 A1* | 1/2021 | Pachoud | ............. | H01H 47/002 |
| 2021/0021714 A1* | 1/2021 | Hirabayashi | .......... | H04W 24/00 |
| 2022/0138512 A1* | 5/2022 | Saillet | ..................... | G06F 18/22 382/159 |
| 2022/0200331 A1* | 6/2022 | Gao | ........................ | H02J 7/35 |
| 2023/0246717 A1* | 8/2023 | Yamamoto | ........... | H04B 10/808 398/197 |
| 2023/0353916 A1* | 11/2023 | Matatyaou | ......... | H04N 21/6118 |

\* cited by examiner

SYSTEMS AND METHODS FOR COMBINATION TELECOMMUNICATIONS AND POWER NETWORKS

CROSS-REFERENCE TO RELATED APPLICATIONS

This application claims the benefit under 35 U.S.C. § 119 of application No. 63/322,721, filed 23 Mar. 2022, and titled SYSTEMS AND METHODS FOR MODULAR SOLAR-OPTICAL BUILDING NETWORK HYPERGRAPH, which is hereby incorporated herein by reference for all purposes.

TECHNICAL FIELD

The present disclosure is directed to systems and methods for combining telecommunications networks and power networks. More particularly, the present disclosure is directed to systems and methods of combining optical telecommunications networks and solar power networks.

BACKGROUND

A typical building contains a variety of electronic systems and to deliver a variety of services through the building. For example, a building may contain one or more of an electrical power systems, telecommunications systems, computer systems and the like. The electronic systems typically include a plurality of networked nodes. For example, an electrical power system may comprise one or more solar arrays, batteries, inverters, power switches, and/or the like, electrically connected to one another by metal wiring relationships. As another example, a telecommunications system may comprise one or more modems, routers, switches, and/or the like, communicatively coupled to one another as relationships, for example by metal wiring, optical cabling, wireless radios, and/or the like.

The electronic systems and cabling within a building may evolve over the life of the building. Existing electronic systems may be expanded, upgraded, modified and abandoned, and new electronic systems may be added to a building with existing electronic systems. For example, a building with an electrical power system connected to a utility power supply may be upgraded to include a renewable power supply, for example solar arrays and batteries. As another example, a building with a telecommunications system including an Ethernet network of metal wiring and Ethernet switches may have the Ethernet network replaced with an optical network of optical cabling and optical switches.

As the electronic systems of a building evolve of the life of the building, the building may come to contain a fragmented mix of new, old, upgraded, abandoned, and the like of electronic systems and cabling. Furthermore, the fragmented electronic systems and cabling may not operate effectively together, resulting in siloed systems with unnecessary redundancies and inefficiencies, and leading to further fragmentation between systems. As a result, management of the electronic systems may become increasingly complex and difficult as the electronic systems of a building evolve, and become increasingly fragmented over the life of the building. There is a general desire for a method and system that addresses one or more of the difficulties with managing electronic systems of buildings.

Off-site cloud computing systems may be used to address one or more of the difficulties with managing electronic systems of buildings. However, off-site cloud computing systems may not be able to completely replace on-premise computing systems, because off-site systems may not be able to meet the uptime and/or reliability of on-site systems. For example, a telecommunications network connecting an off-site system to a building, for example a satellite data network, may not have equal uptime as a wired Ethernet network and/or server within the building.

Furthermore, off-site cloud computing systems be unable to replace one or more on-premise computing systems due to fragmented and/or siloed computing hardware. For example, computing system hardware and/or software from distinct vendors may be installed over the life of a building by distinct contractors, leading to further fragmented and/or siloed computing systems. There is a general desire for a method and system that addresses one or more of the difficulties with managing fragmented and/or siloed computing and cabling systems The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some embodiments of the present invention may provide a building solar-optical building network hypergraph for one or more building lifecycle phases including: pre-construction, construction and operations.

Some embodiments of the present invention may be implemented using modular telecom and electrical connectors that do not require specialized on-site personnel such as electricians or engineers for installation and modification.

Some embodiments of the present invention may be scalable for buildings of one or more sizes, and/or whether existing, new or virtual projects.

Some embodiments of the present invention may enable accelerated commissioning of remote systems automations through live data collected from on-site systems.

Some embodiments of the present invention may improve the efficiency of one or more of: professional building architecture, engineering, construction, contractor and operational professional services, through live data collected from on-site systems.

Some embodiments of this invention may enable the elimination of dedicated spaces within buildings for telecom/IT hardware and/or computer servers.

Some embodiments of this invention may enable dual module redundancy of data link and/or power backup throughout the building.

Some embodiments of this invention may provide an on-site shared server environment to support virtualized and/or containerized on-premise and/or cloud computing applications.

Some embodiments of this invention may provide an on-site shared server environment with a building graph database and/or GraphQL™ API data service for improved data storage and/or transfer between on-premise and cloud computing applications.

Those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

One aspect of the invention provides a combined telecommunications and power network, the network comprising: one or more optical network terminals; one or more optical network splitters, wherein each of the optical network splitters are optically connected to a respective one of the optical network terminals; one or more optical line terminals, wherein each of the optical line terminals are optically connected to one or more of the optical network splitters; one or more network switches, wherein each of the network switches are connected to one or more of the optical line terminals; one or more routers, wherein each of the routers are connected to one or more of the network switches; one or more modems, wherein each of the modems are electrically connected to one or more of the routers; one or more automatic transfer switches, wherein each of the automatic transfer switches electrically powers one or more of the optical network terminals; one or more power sources, wherein each of the power sources is electrically connected to a respective one of the automatic transfer switches; and a server system, wherein the server system is in communication with one or more of: one or more of the network switches and one or more of the optical network terminals.

In addition to the exemplary aspects and embodiments described above, further aspects and embodiments will become apparent by reference to the drawings and by study of the following detailed descriptions. It is emphasized that the invention relates to all combinations of the above features, even if these are recited in different claims.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

There exists more than one global crisis that requires countries, corporations, and individuals to cooperate remotely to accurately network, power, and integrate systems within existing and new buildings. There is a clean air crisis within buildings from evolving airborne viruses and a planetary greenhouse gas crisis from fossil fuel gas emissions outside of buildings. Both crises require the collaboration of novel scientific, engineering, construction and operational solutions and systems for constructed buildings as well as the natural environment. Both unique in its design and uniquely located, each constructed buildings contains a fragmented mix of wired building technologies, telecommunications networks, computing hardware and backup power systems. As a result, managing on-premise wired systems and backup power infrastructure across a building's life cycle is also a complex and fragmented task. By extending modular and scalable network and power connectivity, on-premise cloud applications can be enabled within buildings at scale.

In the following description, reference is made to the accompanying drawings, which form a part thereof and which show, by way of illustration, examples of how the claimed subject matter may be implemented in a simplified manner. It is to be understood that other implementations can be made and used without departing from the scope of the claimed subject matter.

Figure 1:
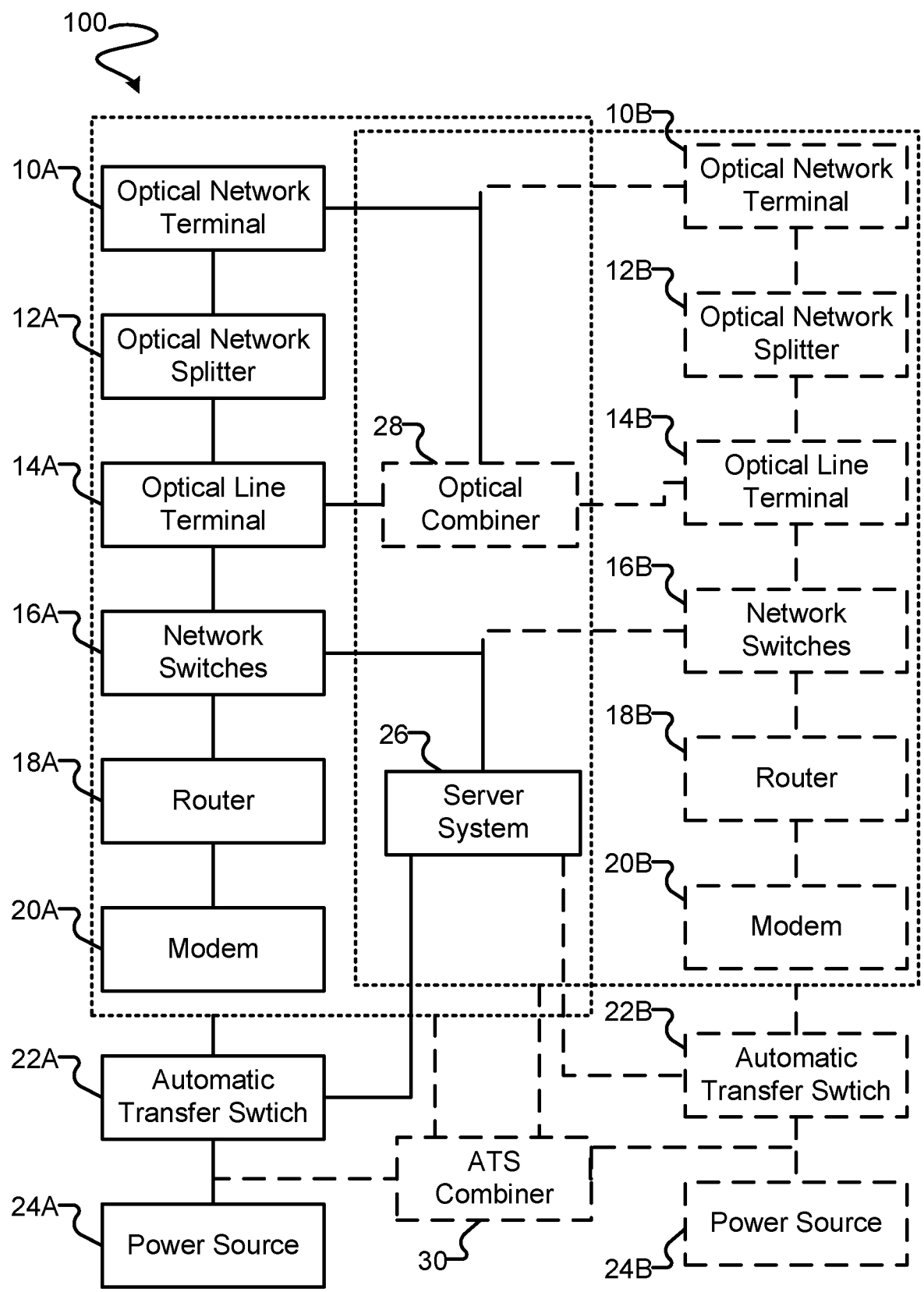
FIG. 1 is a schematic diagram of a combined telecommunications and power network according to an example embodiment of the present invention.

FIG. 1 depicts combined telecommunications and power network 100 according to an example embodiment of the present invention. Network 100 comprises optical network terminal 10A and one or more optional optical network terminals, for example optical network terminal 10B. Optical network terminals 10A and 10B are referred to collectively as optical network terminals 10. Optical network terminals 10 may communicate with an internet service provider (ISP) network or an on-premise network (described below) to provide internet access. Optical network terminals 10 are connected to the ISP network or an on-premise network by fiber-optic cables.

In some embodiments, network 100 comprised one or more optical network terminal power sources (not shown), wherein each of the optical network terminal power sources electrically powers a respective one of optical network terminals 10. The optical network terminal power sources may comprise one or more of: a connection to a utility power supply, batteries stored within the respective one of the optical network terminals, an uninterruptable power supply, Power-over-Ethernet (PoE), and the like.

Network 100 further comprises optical network splitter 12A and one or more optional optical network splitters, for example optical network splitter 12B. Optical network splitters 12A and 12B are referred to collectively as optical network splitters 12. Each of optical network splitters 12 are optically connected to a respective one of optical network terminals 10. For example, optical network splitter 12A is optically connected to optical line terminal 14A. Each of optical network splitters 12 may split an optical signal from one of optical line terminals 14 (described below) in to two or more optical signals, and allow two or more optical network terminals 10 to be optically connected to a single one of optical line terminals 14. In some embodiments, one or more of optical network splitters 12 may passively split an optical signal into two or more signals, thereby not requiring a power source to operate.

Network 100 further comprises optical line terminal 14A and one or more optional optical line terminals, for example optical line terminal 14B. Optical line terminals 14A and 14B are referred to collectively as optical line terminals 14. Each of optical line terminals 14 are optically connected to one or more of optical network splitters 12. Each of optical line terminals 14 receives one or more optical signals over a fiber-optic cable, and converts the optical signal to an electrical signal. In some embodiments, one or more of optical line terminals 14 may convert an optical signal from a fiber-optic cable to an electrical signal on a metal wire or back to an optical signal on a glass wire by means of small-form factor pluggable transceivers (e.g. SFP, SFP+).

Network 100 further comprises network switch 16A and one or more optional network switches, for example network switch 16B. Network switches 16A and 16B are referred to collectively as network switches 16. Each of network switches 16 are connected to one or more of optical line terminals 14. Each of network switches 16 transfer data between two or more devices to enable communication, for example between one of optical line terminals 14 and one of routers 18 and/or system server 26.

In some embodiments of network 100, one or more of network switches 16 comprise one or more optical switches, and each of the optical switches are optically connected to one or more of optical line terminals 14. In some embodiments of network 100, one or more of network switches 16 comprise one or more Ethernet switches, and each of the Ethernet switches are electrically connected to one or more of optical line terminals 14 by an Ethernet connection.

Network 100 further comprises router 18A and one or more optional routers, for example router 18B. Routers 18A and 18B are referred to collectively as routers 18. Each of routers 18 are connected to one or more of network switches 16. Each of routers 18 transfer data between two or more devices, for example between one of network switches 16 and one of modems 20 (described below). Each of routers 18 may also provide network address translation, for example between one or more network address within network 100, and one or more network addresses outside of network 100.

Network 100 further comprises modem 20A and one or more optional modems, for example modem 20B. Modems 20A and 20B are referred to collectively as modems 20. Each of modems 20 are electrically connected to one or more of routers 18. Modems provide data access to networks external to network 100, for example the internet.

In some embodiments of network 100, one or more of modems 20 comprise wired and/or wireless modems. For example, one or more of modems 20 may comprise: a cable modem, a digital subscriber line (DSL) modem, a WiFi modem, a satellite modem, a radio modem, and the like.

Network 100 further comprises automatic transfer switch 22A and one or more optional automatic transfer switches, for example automatic transfer switch 22B. Automatic transfer switches 22A and 22B are referred to collectively as automatic transfer switches 22. Each of automatic transfer switches 22 electrically power one or more of other devices of network 100, for example one or more of optical line terminals 12 or optical network terminals 10. Each of automatic transfer switches 22 switches an electrical load between a primary and one or more alternate power sources. For example, automatic transfer switch 22A may power optical network terminal 10A with a primary power source, and automatically switch to powering network terminal 10A with an alternate power source when automatic transfer switch 22A detects an interruption in the power from the primary power source.

In some embodiments of network 100, one or more of automatic transfer switches 22 electrically powers one or more of: one or more of the optical line terminals 14, one or more of the network switches 16, one or more of the routers 18, one or more of the modems 20, and server system 26.

Some embodiments of network 100 comprise one or more automatic transfer switch combiners, for example automatic transfer switch combiner 30. Automatic transfer switch combiner 30 is electrically connected to two or more of the automatic transfer switches 22, and powers one or more devise of network 100. For example, automatic transfer switch combiner 30 may power one or more of: one or more of the optical network terminals 10, one or more of the optical line terminals 14, one or more of network switches 16, one or more of routers 18, one or more of modems 20, and server system 26.

Network 100 further comprises power source 24A and one or more optional power sources, for example power source 24B. Power sources 24A and 24B are referred to collectively as power sources 24. Each of power sources 24 are electrically connected to a respective one of automatic transfer switches 22. Power sources 24 provide either a primary or an alternate power source to each of automatic transfer switches 22.

Network 100 further comprises server system 26, wherein server system 26 is in communication with one or more of network switches 16 and may be powered by one or more of automatic transfer switches 22.

Some embodiments of network 100 comprise one or more optical combiners, for example optical combiner 28. Optical combiner 28 is optically connected to two or more optical line terminals 10, and one or more optical network terminals 10. Optical combiner 28 combines optical signals from optical line terminals 14 and provides a combined optical signal to optical network terminals 10. Combining two or more optical signals provides redundancy, and thereby may increase reliability and uptime of the optical signal provided to one more of optical network terminals 10.

Figure 2:
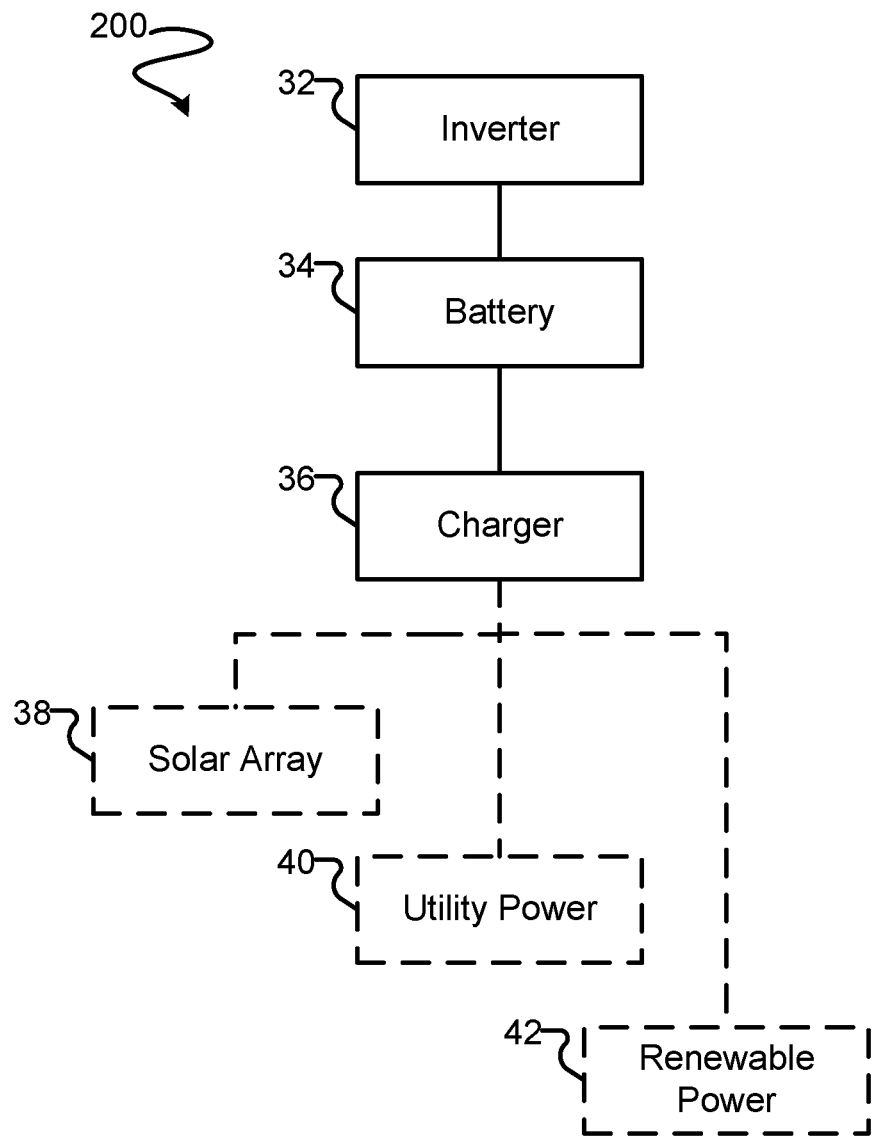
FIG. 2 is a schematic diagram of a power source according to an example embodiment of the present invention.

FIG. 2 depicts an example embodiment of one or more of power sources 24, for example power source 24A. Power source 24A comprises inverter 32 electrically connected to automatic transfer switch 22A, battery 34 electrically connected to inverter 32, and charger 36 electrically connected the battery 34. Some embodiments of power source 24A further comprise one or more of: solar array 38, utility power source 40, and renewable power source 42. Renewable power source 42 may comprise one or more of: a wind power source such as a wind turbine, a hydro-electric power source such as a hydro-electric dam or a tidal generator, and the like.

Server system 26 is configured to receive data from one or more of network switches 16 and be powered by one or more of automatic transfer switches 22. Server system 26 is further configured to organize the data into a graph database, and provide access to the graph database via one or more of network switches 16. The graph database may comprise a knowledge graph triple-store database.

In some embodiments, server system 26 provides access to the graph database via one or more of switches 16, routers 18 and modems 20. Providing access to the graph database may comprise providing access to an application program interface (API), for example a GraphQL™ API. Providing access to the graph database may comprise server system 26 providing a user interface to the graph database.

Server system 26 may comprise one or more containerized applications that access the graph database, and providing access to the graph database may comprise server system 26 providing access to the one or more containerized applications.

Containerized applications package software application code with operating system (OS) libraries and one or more other dependencies required to run the application code in a single lightweight executable, referred to as a container. A container runs consistently on any infrastructure. Containers may be more portable and resource-efficient than other methods of deploying software applications, such as virtual machines (VMs).

Containerized applications may be created and deployed faster and more securely than other methods. With other methods, application code may be developed in a specific computing environment which, when transferred to a new computing environment, can result in bugs and other errors. Containerization may remove one or more problems from transferring application code to a new computing environment by bundling the application code together with one or more necessary configuration files, libraries, and other dependencies required for the application code to run. The container is abstracted from the host operating system, and hence, it stands alone and becomes portable, and able to run in other computing environments, for example cloud computing systems.

In some embodiments, part or all of server system 26 may comprise a cloud computing system located outside of a building. In such embodiments, the cloud computing portion of server system 26 may communicate with network 100 through one or more of modems 20, routers 18, network switches 16, optical line terminals 12, and/or optical network terminals 10.

Server system 26 may be further configured to receive data from one or more of: optical network terminals 10, optical network splitters 12, optical line terminals 14, routers 18, modems 20, and power sources 24, and further organize the received data into the graph database.

In some embodiments, server system 26 is configured to receive data from one or more of: a plan file, a photo file, a building model file, live markup object geometry metadata, and organize the received data into the graph database. The data received by server system 26 and organized into the graph database may comprise live data representing real-time operation of the telecommunications and power network, and/or historical data representing past operation of the telecommunications and power network.

In some embodiments, server system 26 comprises one or more machine learning models trained on the graph database.

A graph databases is a database configured to analyze data stored within the database, identify and generate relationships between the data and sources of the data, and draw conclusions between the data sources of the data.

Some graph databases implement GraphQL™, a query language structured as a graph to design and query a graph database using a web application architecture. Using a graph database and GraphQL™, one or more embodiments of the present invention may determine one or more relationships between one or more of: power, energy, data transfer, networking, and time within a combined telecommunications and power network, for example a combined telecommunications and power network of a building.

In some embodiments, a GraphQL™ API can be automatically generated from the graph database. Automatically generating the GraphQL™ API may have certain advantages, for example accurately modelling telecommunications and power systems when new nodes (devices) and relationships (communications and power links between devices) are introduced through the life of a building.

In some embodiments, server system 26 is configured to provide a control output, wherein the control output modifies the operation of one or more of: one or more of optical network terminals 10, one or more of the optical network splitters 12, one or more of optical line terminals 14, one or more of network switches 16, one or more of routers 18, one or more of modems 20, one or more of automatic transfer switches 22, and one or more of power sources 24. The control output may reduce the power consumption of the device to which it is provided such that network 100 consumes less power than without server system 26 providing the control input.

In some embodiments of network 100, network 100 generates a first amount of electrical energy within a period, consumes a second amount of electrical energy within the period, wherein the first amount of electrical energy is equal or greater than the second amount of electrical energy. In such embodiments, network 100 is self powered, and does not requires external power to operate.

In some embodiments of network 100, the first amount of electrical energy is generated from one or more solar cells 38 and/or renewable power sources 42. In such embodiments, network 100 generates zero-emissions, meaning zero carbon emissions as would be emitted for example by a diesel generator.

Network 100 may be used as all or part of a telecommunications and power network in one or more physically separate buildings. In some embodiments, network 100 may be used as all or part of a telecommunications and power network in a building under construction, or as a retrofit of an already constructed building.

To illustrate an example embodiment of the present the invention, the following examples have been drawn and will be described:

a. Modular optical building network diagram (FIG. 3).
   b. Modular solar building network diagram (FIG. 4).
   c. Hypergraph software model diagram (FIG. 5)

Figure 3:
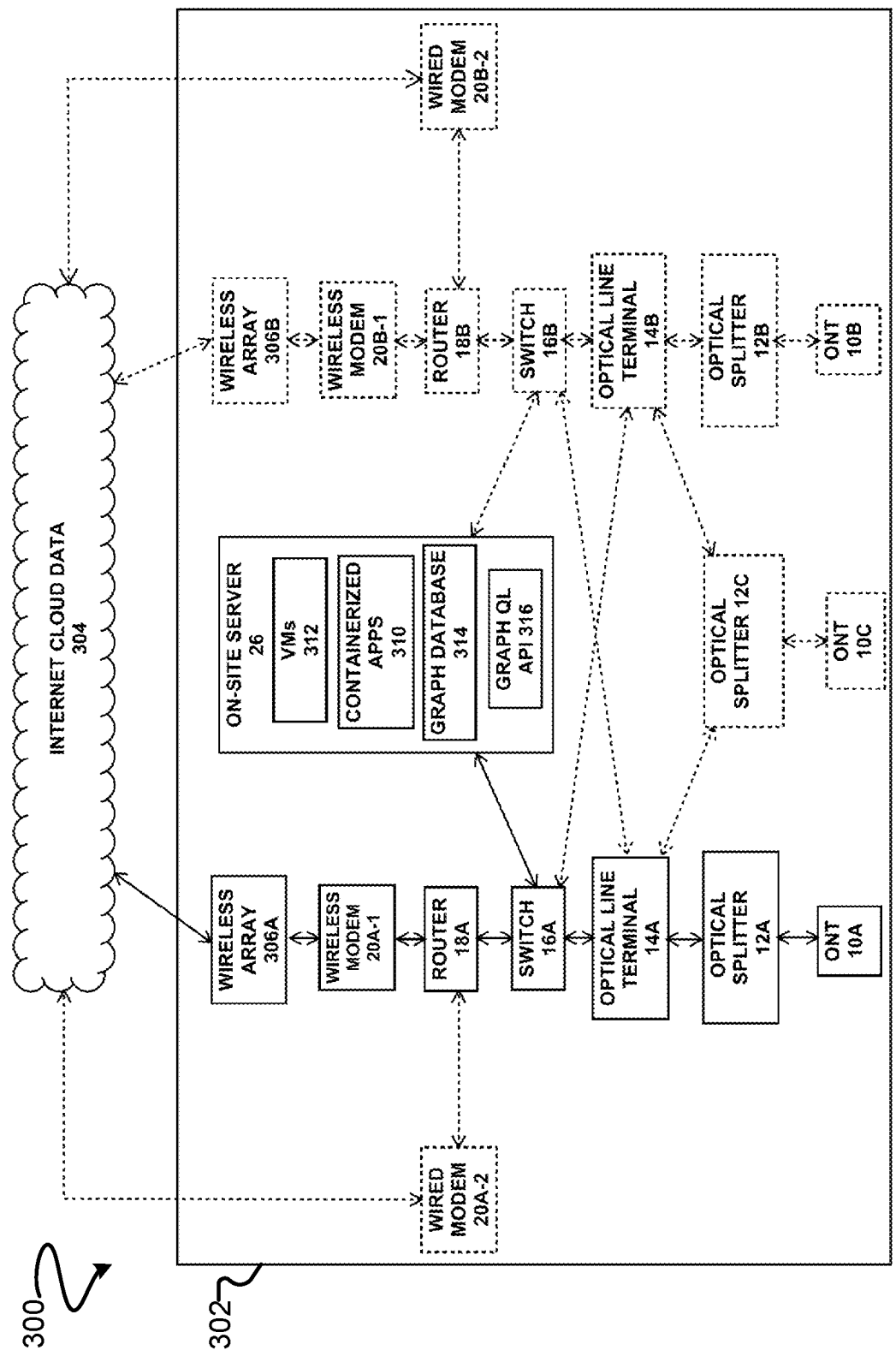
FIG. 3 is a schematic diagram of a modular optical building network according to an example embodiment of the present invention.

FIG. 3 is a schematic diagram of a modular optical data network 300 according to an example embodiment of the present invention. Network 300 may be an optical network of a building 302. Building 302 may be a constructed building, or an under construction building.

FIG. 3 depicts a first data network in solid lines, and an optional second data network in dashed lines. When the optional second network is used with the first network, the combined first and second network provide double modular redundancy. Modular redundancy can be added and upgraded concurrently to improve the reliability of network 300 using lower cost modules in parallel configurations.

Network 300 can send and receive internet cloud data 304 by means of one or more wireless arrays 306A and 306B respectively controlled by wireless modems 20A-1 and 20B-1, and/or one or more wired modems 20A-2 and 20B-2.

Wireless modems 20A-1 and 20B and/or wired modems 20A-2 and 20B-2 are respectively connected to routers 18A, 18B. Routers 18A, 18B may provide load balancing between two or more of modems 20A-1, 20B-1, 20A-2 and 20B-2, to provide improved connection between network 300 and internet cloud data 304, for example if the connection between one or more of modems 20A-1, 20B-1, 20A-2 and 20B-2 and internet cloud data 304 fails. In some embodiments, a network load may be balanced between two or more of modems 20A-1, 20B-1, 20A-2 and 20B-2. Balancing a network load between two or more of modems 20A-1, 20B-1, 20A-2 and 20B-2 may increase the available bandwidth and system failure redundancy. Routers 18A, 18B may comprise physical hardware and/or software defined network applications.

Routers 18A, 18B may be connected to one or more respective switches 16A, 16B, wherein switches 16A, 16B provide Ethernet connectivity to downstream devices by means of Ethernet cabling links. Switches 16A, 16B may provide link aggregation and automatic failover to provide internet cloud data 304 access if one of the connections fails. The use of link aggregation simultaneously increases the available bandwidth and reduces the system failure probability.

One or more of modems 20A-1, 20B-1, 20A-2 and 20B-2, switches 16A, 16B, and routers 18A, 18B may comprise physical hardware and/or software defined network containerized applications 310.

Switches 16A, 16B may be connected to one or more respective optical line terminals (OLTs) 14A, 14B, and one or more on-site server systems 26.

Optical line terminals (OLTs) 14A, 14B may comprise operating software, wherein the operating software comprises one or more of containerized applications 310.

Optical line terminals 14A, 14B may be connected to one or more optical splitters 12A, 12B, 12C by means of a single mode fiber optic cabling.

Optical splitters 12A, 12B, 12C may connect to one or more optical network terminals (ONTs) 10A, 10B, 10C by means of single mode fiber optic cabling.

One or more of optical network terminals 10A, 10B, 10C, for example ONT 10C, may be provided with dual redundancy by optical splitter 12C, wherein optical splitter 12C provides failover redundancy between optical line terminal 14A and optical line terminal 14B to provide double module redundancy to ONT 10C.

One or more of ONTs 10A, 10B, 10C can connect to on-premise computing hardware if dual network interface card (NIC) copper Ethernet ports are available.

On-site server system 26 may comprise virtual machines (VMs) 312, containerized applications (apps) 310, graph database 314 and/or GraphQL™ API 316.

The individual and/or combined data of some or all energy consuming devices within building 302 may be aggregated in real-time within graph database 314. Graph database 314 may be made available by means of GraphQL™ API 316 allowing for efficient and/or selective data transfer and/or computations between on-premise and off-premises cloud applications.

Figure 4:
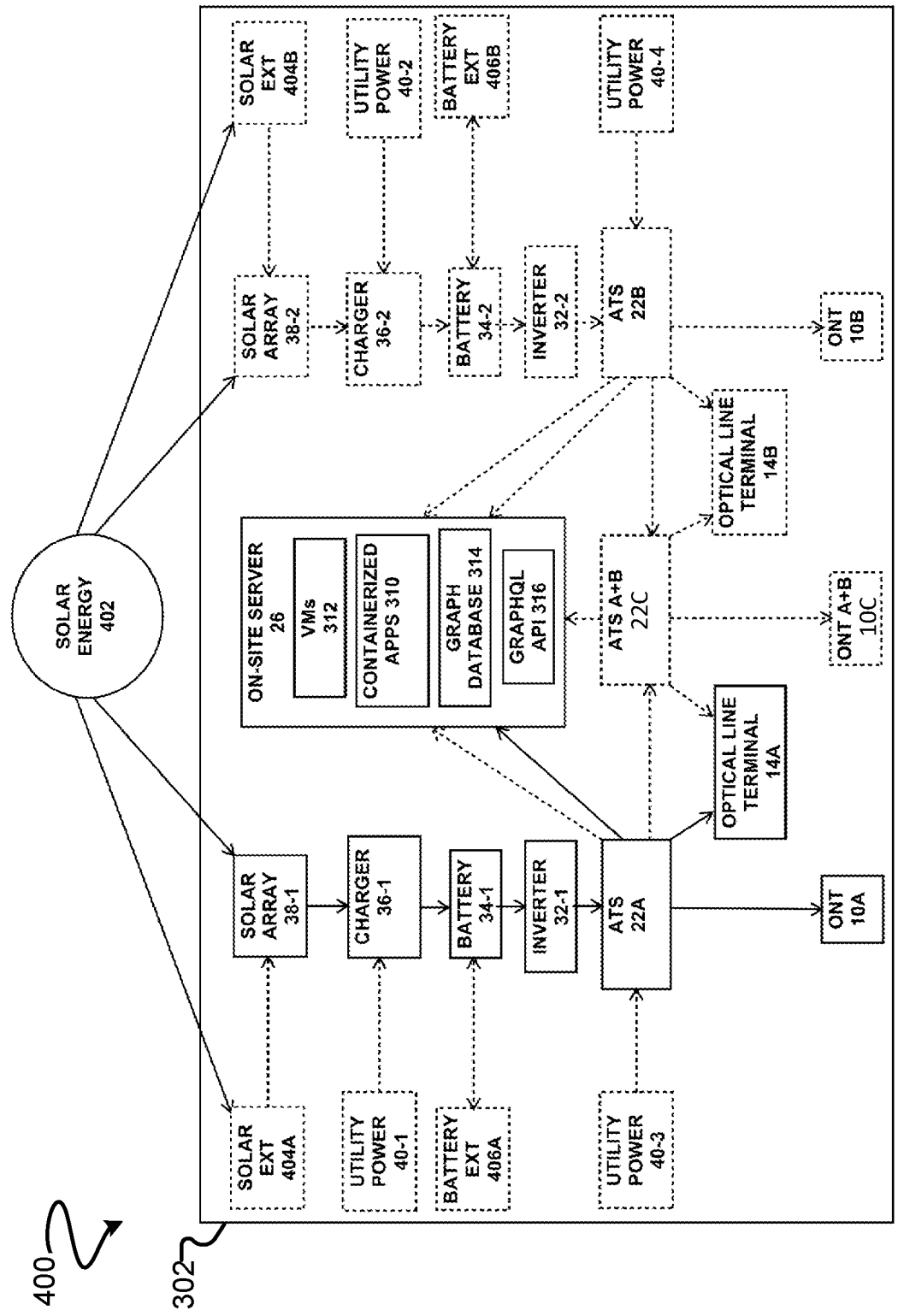
FIG. 4 is a schematic diagram of a modular solar building network according to an example embodiment of the present invention.
Figure 5:
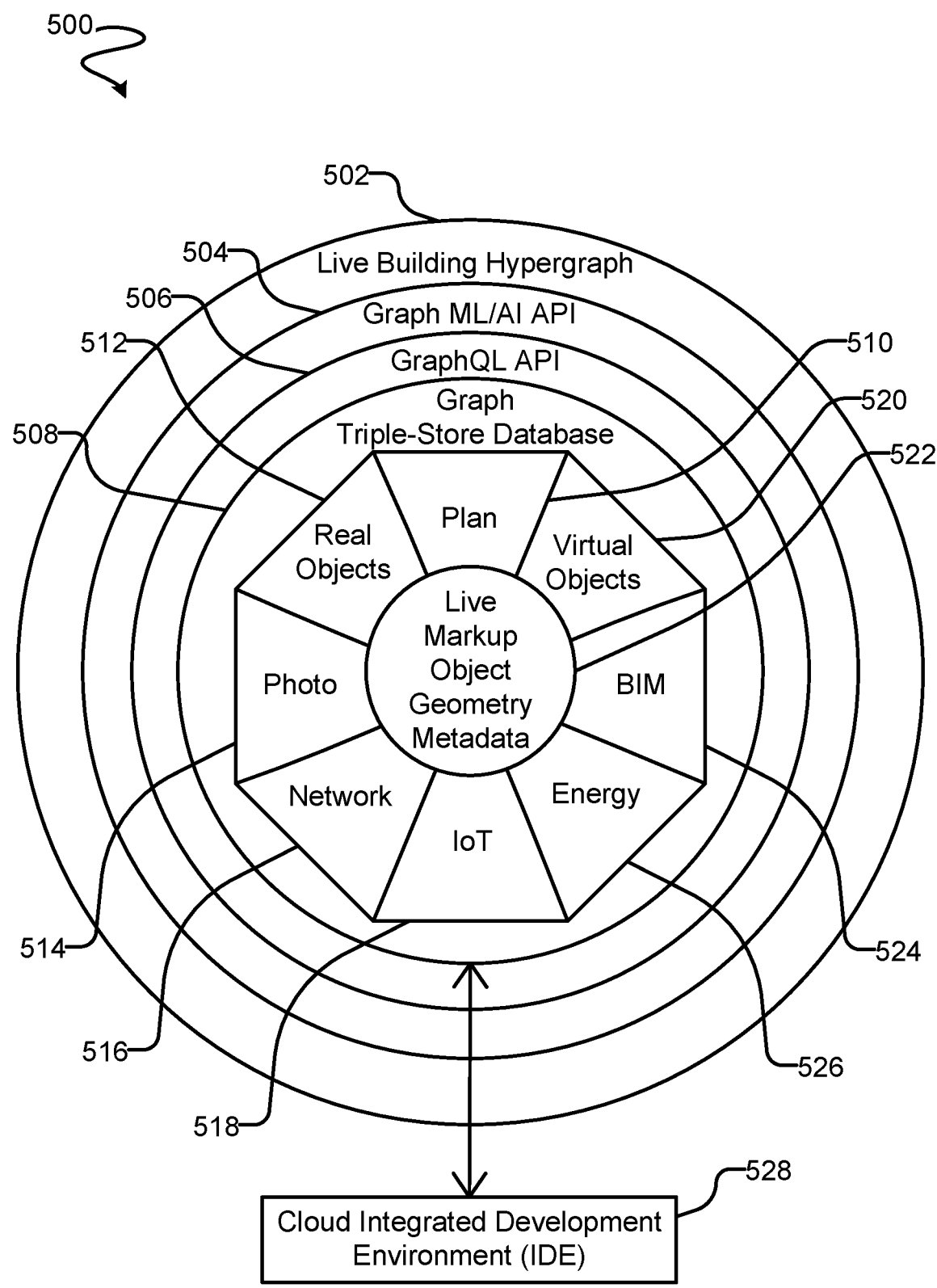
FIG. 5 is a schematic diagram of a hypergraph software model according to an example embodiment of the present invention.

FIG. 4 is a schematic diagram of modular solar building network 400 according to an example embodiment of the present invention. Network 400 may be a solar network of building 302.

FIG. 4 depicts a first solar power network in solid lines, and an optional second solar power network in dashed lines. When the optional second network is used with the first network, the combined first and second network provide double modular redundancy. Modular redundancy can be added and upgraded concurrently to improve the reliability of network 400 using lower cost modules in parallel configurations.

Building 302 can receive solar energy 402 by means of one or more solar arrays 38-1, 38-2, with one or more solar extension (EXT) arrays 404A, 404B in a series and/or parallel wiring configuration to extend the power generation capacity of network 400. Solar extension arrays 404A, 404B may be a thin film solar adhesive applied to a building envelope of building 302.

In some embodiments, one or more of solar arrays 38-1, 38-2 and solar extension arrays 404A, 404B may reflect sunlight up towards the stratosphere by means of a dynamic switchable reflective thin film for cooling applications when not used for electricity generation.

Solar arrays 38-1, 38-2 and/or solar extension arrays 404A, 404B may connect to one or more respective chargers 36-1, 36-2.

Chargers 36-1, 36-2 may be connected to one or more respective utility power sources 40-1, 40-2 and act as a switch to control charging of batteries 34-1, 34-2 between utility power sources 40-1, 40-2 and solar arrays 38-1, 38-2.

Battery extension modules 406A, 406B may be added in a series and/or parallel wiring configuration to extend runtime of batteries 34-1, 34-2. Two or more of batteries 34-1, 34-2 and battery extension modules 406A, 406B may be combined in series and/or parallel to create a single shared battery source.

Batteries 34-1, 34-2 and/or battery extension modules 406A, 406B may be connected to one or more respective inverters 32-1, 32-2. Inverters 32-1, 32-2 convert DC power to AC power, for example DC power from one or more of batteries 34-1, 34-2 and battery extension modules 406A, 406B. In some embodiments, network 400 may comprise a DC only network, wherein network 300 draws only DC power, for example due to power supply selection.

Inverters 32-1, 32-2 may be connected to one or more respective automatic transfer switches (ATSs) 22A, 22B. Wires utility power sources 40-3, 404 may also be connected to automatic transfer switches 22A, 22B. Automatic transfer switches 22A, 22B may control the switching between AC power sources automatically in the event of a failure in upstream modules.

Automatic transfer switches 22A, 22B may connect to one or more respective optical line terminals 14A, 14B, optical network terminals (ONTs) 10A, 10B, and one or more on-site servers 26.

Automatic transfer switches 22A, 22B may be connected to a downstream combined automatic transfer switch (ATS A+B) 22C.

Combined automatic transfer switch 22C may be connected to one or more optical network terminal (ONT) 10C and/or one or more on-site server 26.

One or more of optical network terminals 10A, 10B, 10C, for example ONT 10C, may be provided with dual redundancy by automatic transfer switch 22C, wherein automatic transfer switch 22C provides failover redundancy between automatic transfer switch 22A and automatic transfer switch 22B to provide double module redundancy to ONT 10C.

The individual and/or combined data of all energy consuming devices within building 302 may be aggregated in real-time within graph database 314. Graph database 314 may be made available by means of GraphQL™ API 316 allowing for efficient and/or selective data transfer and/or computations between on-premise and off-premises applications.

One or more of modems 20A-1, 20A-2, 20B-1, 20B-2, routers 18A, 18B, switches 16A, 16B, optical line terminals 14A, 14B, optical splitters 12A, 12B, 12C, optical network terminals 10A, 10B, 10C, and server system 26, may be powered by one or more of automatic transfer switches 22A, 22B, 22C.

One or more of ONTs 10A, 10B, 10C may be locally powered with backup power provided by their own internal batteries or local uninterruptible power supplies.

FIG. 5 is a schematic diagram of building knowledge hypergraph service model 500.

In one or more embodiments of the present invention, building network data 516, Internet-of-Things (IoT) data 518 and energy data 526 is stored within a graph triplestore database 508.

Building graph database 508 is a significant improvement to traditional structured databases as a graph can contain a combination of structured and unstructured documents dynamically linked as relationships through an extensible schema structures.

Live building network system data and metadata 516, Internet-of-Things (IoT) system data and metadata 518 and energy system data and metadata 526 may be used to generate and analyze relationships between real 512 and virtual objects 520 across a number of complimentary building applications including: plan file applications 510, photo file applications 514, and building information modeling (BIM) file applications 524, along with live markup object geometry metadata 522 extracted from user file applications.

In some embodiments, data is imported into the graph database by one or more of: importing a comma separated value (CSV) file, importing a JSON file, or through an application program interface (API) of the database.

Furthermore, GraphQL™ API service 506 enables graph machine learning and artificial intelligence APIs 504 that can automatically benefit from the graph database 508 relationships and computations.

Graph database 508 may be connected with GraphQL™ API 506 to provide a GraphQL™ API data service with better performance than traditional REST APIs. In a preferred embodiment, both GraphQL™ and REST APIs are available within building hypergraph data service 502.

With GraphQL™ API 506, building network data 516, Internet-of-Things data (IoT) 518, and energy data 526 can be linked to other live databases to form dynamic hypergraph relationships as a live streaming web API service 506.

In a preferred embodiment, dynamic cross-database hypergraph model 500 and hypergraph service 502 may be automatically generated by one or more cloud integrated development environments 528.

GraphQL™ API 506 may enable data transfer between the graph database and 3 rd party API applications which would benefit from live knowledge graph relationship insights 502 between multiple data sources as continuous graph machine learning and artificial intelligence building service 504.

Some Embodiment

Certain embodiments of the invention disclosed herein may be developed independently for one or more optical, electrical and/or computing system, and later integrated together. Such an approach may enable parallel, dynamic and scalable implementation of the system within a building or outdoor area.

Certain embodiments of the invention disclosed herein may reduce or eliminate copper communication cabling media within buildings and between buildings. Copper data cabling has frequency transmission limitations due to circuit resistance, capacitance and impedance. Reducing copper cabling media may also reduce the need for copper cable shielding, where copper cable shielding is required for communications applications.

Certain embodiments of the invention may eliminate on-site silo server hardware within a building by transferring the functionality of the on-site server hardware to the system.

Certain embodiments of the invention may be dynamically connected with electric vehicles to extend communication, electrical power, and/or data transfer capabilities between systems.

Certain embodiments of the invention may be dynamically connected with renewable energy sources to extend communication, electrical power, and/or data transfer capabilities between systems.

Certain embodiments of invention may enable optical computing applications.

Certain embodiments of invention may eliminate silo building telecom and/or IT systems floor space requirements within building space planning.

Certain embodiments of invention may share communication, electrical power, and/or server capacity to enable wired cabling building and/or tenant applications such as: integrated automation controls, mechanical, electrical, communications and electronic security systems.

Certain embodiments of invention may share communication, power and/or server capacity to enable wireless radio building and/or tenant applications such as: WiFi/WiFi6, 3G/4G/5G/6G licensed and unlicensed frequencies, C-RAN, IoT, RFID, and/or mobile computing device radios.

Certain embodiments of the invention may enable zero-emission and/or zero-energy material and operational energy lifecycles for building IT systems.

Certain embodiments of the invention may provide certain advantages when applied to both communications and power networks. For example, the dynamic cross-database hypergraph model 500 may provide new/different outputs when model 500 contains data from both communication and power networks for the same building. Advantages include live hypergraph computations of building cross-system energy 526, IoT 518, BIM 524, radio frequency identification (RFID), robotics, material, logistics, transportation, environmental, medical, sensor, actuator, climate, computing device, virtual/augmented reality object 520 and/or real object 512 relationships.

Certain embodiments of the invention may collect and analyze cross-systems time-series graph 508 and GraphQL™ API 506 data for dynamic building energy reduction optimizations using machine learning and/or artificial intelligence 504 as a live building hypergraph service 502.

Certain embodiments of the invention may be interconnected to enable an adaptable and sharable networking mesh using a combination of wired and/or wireless connectivity between buildings.

One or more embodiments of the present invention may be used for one or more of the following applications:
 a. existing buildings;
 b. construction buildings;
 c. new buildings;
 d. mobile machines and vehicles;
 e. city scale telecommunications networks; and
 f. outdoor networks.

Certain embodiments of the invention disclosed herein are described using a passive optical network architecture. However, one or more embodiments of the present invention may comprise a copper-based Ethernet network architecture as an alternative or in addition to a passive optical network architecture.

Certain embodiments of the invention disclosed herein are described using a solar power generator. However, one or more embodiments of the present invention may comprise other renewable energy sources as an alternative or in addition to a solar power generator.

Certain embodiments of the invention disclosed herein are described using a hypergraph database service using a graph triple-store database and GraphQL™ API. However, one or more embodiments of the present invention may comprise SQL and no-SQL databases as an alternative or in addition to a graph triple-store database. Furthermore, one or more embodiments of the present invention may comprise a REST API as an alternative or in addition to a GraphQL™ API.

One or more embodiment of the present invention are described in the context of a building, or as installed in a building. In one or more embodiments:
- a "building" may include a contiguous and substantially enclosed structure containing a electrical and a telecommunication network, for example a condominium building, an office tower, a high-rise building, a mixed use development, a home, a structure and the like;
- a "building" may include two or more physically separate structures, wherein an electrical or optical network is shared between the separate structures, for example a building with an optical line terminal that provides optical connectivity to an optical network terminal located within a separate structure and/or one or more outdoor renewable power supplies like solar panels, wind turbines, and the like;
- a "building" may include natural or human-made structures that do not necessarily have fabricated walls such as bridges, dams, tunnels, roadways, poles and towers, and the like;
- a "building" may include mobile structures that may switch between stationary or mobile modes of operation for example: telecom cabinets, shipping containers or self-powered vehicles, and the like; and
- a "building" can be of any location and size provided it may contain an optical line terminal or an optical network terminal, and the like.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, video projectors, audio-visual receivers, displays (such as televisions), digital cinema projectors, media players, and other devices suitable for the purposes described herein. Those skilled in the relevant art will appreciate that aspects of the system can be practiced with other communications, data processing, or computer system configurations, including: Internet appliances, handheld devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, minicomputers, single board computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media, hard disk drives, optical data storage media, electronic data storage media including ROMs, flash RAM, EPROMs, hardwired or preprogrammed chips (e.g., EEPROM semiconductor chips), optical computing, quantum computing, nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a model, a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A combined telecommunications and power network, the network comprising:
   one or more optical network terminals;
   one or more optical network splitters, wherein each of the optical network splitters are optically connected to a respective one of the optical network terminals;
   one or more optical line terminals, wherein each of the optical line terminals are optically connected to one or more of the optical network splitters;
   one or more network switches, wherein each of the network switches are connected to one or more of the optical line terminals;
   one or more routers, wherein each of the routers are connected to one or more of the network switches;
   one or more automatic transfer switches, wherein each of the automatic transfer switches electrically powers one or more of: one or more of the optical line terminals and one or more of the optical network terminals;
   one or more power sources, wherein each of the power sources is electrically connected to a respective one of the automatic transfer switches; and
   a server system, wherein the server system is in communication with one or more of: one or more of the network switches and one or more of the optical network terminals;
   wherein the server system is configured to:
     receive data from the network switches;
     organize the data into a graph database; and
     provide access to the graph database via one or more of the network switches.

2. The telecommunications and power network of claim 1, wherein the server system is powered by one or more of the automatic transfer switches.

3. The telecommunications and power network of claim 1, wherein the network switches comprise one or more optical switches, and each of the optical switches are optically connected to one or more of the optical line terminals.

4. The telecommunications and power network of claim 1, wherein the network switches comprise one or more Ethernet switches, and each of the Ethernet switches are electrically connected to one or more of the optical line terminals by an Ethernet connection.

5. The telecommunications and power network of claim 1, wherein the network switches comprise one or more Ethernet switches, and one or more of the Ethernet switches power one or more of the optical network terminals by power over Ethernet (PoE).

6. The telecommunications and power network of claim 1, further comprising one or more modems, wherein each of the modems are connected to one or more of the routers.

7. The telecommunications and power network of claim 6, wherein the modems comprise one or more wireless modems.

8. The telecommunications and power network of claim 6, wherein the modems comprise one or more wired modems.

9. The telecommunications and power network of claim 1, further comprising one or more optical combiners, wherein each of the optical combiners are optically connected to two or more optical line terminals and one or more of the optical network terminals.

10. The telecommunications and power network of claim 1, wherein one or more of the automatic transfer switches electrically powers one or more of: one or more of the optical line terminals, one or more of the optical network splitters, one or more of the network switches, one or more of the routers, and one or more of the modems.

11. The telecommunications and power network of claim 1, further comprising one or more optical network terminal power sources, wherein each of the optical network terminal power sources electrically powers a respective one of the optical network terminals.

12. The telecommunications and power network of claim 11, wherein each of the optical network terminal power sources comprises one or more of: a connection to a utility power supply, batteries stored within the respective one of the optical network terminals, a power over Ethernet (PoE) power source, and an uninterruptable power supply.

13. The telecommunications and power network of claim 1, further comprising one or more automatic transfer switch combiners, wherein each of the automatic transfer switch combiners are electrically connected to two or more of the automatic transfer switches, and powers one or more of: one or more of the optical line terminals and one or more of the optical network terminals.

14. The telecommunications and power network of claim 13, wherein one or more of the automatic transfer switch combiners electrically powers the server system.

15. The telecommunications and power network of claim 1, wherein one or more of the power sources comprises:
an inverter electrically connected to a respective one of the automatic transfer switches;
a battery electrically connected to the inverter; and
a charger electrically connected to the battery.

16. The telecommunications and power network of claim 15, wherein one or more of the power sources comprises one or more of: a solar array electrically connected to the charger, and a renewable power source electrically connected to the charger.

17. The telecommunications and power network of claim 15, wherein one or more of the power sources comprises a utility power supply electrically connected to the charger.

18. The telecommunications and power network of claim 1, wherein:
the server system is configured to receive data from one or more of: the optical network terminals, the optical line terminals, the routers, the modems, the automatic transfer switches, and the power sources; and
organize the received data into the graph database.

19. The telecommunications and power network of claim 1, wherein the data comprises live data representing real-time operation of the telecommunications and power network.

20. The telecommunications and power network of claim 1, wherein the data comprises historical data representing past operation of the telecommunications and power network.

21. The telecommunications and power network of claim 1, wherein the server system is configured to:
receive data from one or more of: a plan file, a photo file, a building information model file, network file, energy file, internet of things (IoT) file, live markup object geometry metadata; and
organize the received data into the graph database.

22. The telecommunications and power network of claim 1, wherein the server system is configured to provide access to the graph database via one or more of: the network switches, the routers, and the modems.

23. The telecommunications and power network of claim 1, wherein providing access to the graph database comprises providing access to an application program interface (API).

24. The telecommunications and power network of claim 23, wherein the API is a GraphQL™ API.

25. The telecommunications and power network of claim 24, wherein the server system is configured to automatically generate the GraphQL™ API.

26. The telecommunications and power network of claim 1, wherein the graph database comprises one or more sub-graphs each containing a graph data representation of one or more devices of the network and one or more connections between the devices of the network.

27. The telecommunications and power network of claim 1, wherein the sever system comprises one or more containerized applications that access the graph database, and providing access to the graph database comprises providing access to the one or more containerized applications.

28. The telecommunications and power network of claim 1, wherein the graph database comprises a knowledge graph triple-store database.

29. The telecommunications and power network of claim 1, wherein providing access to the graph database comprises the server system providing a user interface to the graph database.

30. The telecommunications and power network of claim 1, wherein the server system comprises one or more machine learning models trained on the graph database.

31. The telecommunications and power network of claim 1, wherein the server system is configured to provide a control output, wherein the control output modifies the operation of one or more of: one or more of the optical network terminals, one or more of the optical network splitters, one or more of the optical line terminals, one or more of the network switches, one or more of the routers, one or more of the modems, one or more of the automatic transfer switches, and one or more of the power sources.

32. The telecommunications and power network of claim 31, wherein the control output reduces the power consumption of the one or more of: one or more of the optical network terminals, one or more of the optical network splitters, one or more of the optical line terminals, one or more of the network switches, one or more of the routers, one or more of the modems, one or more of the automatic transfer switches, and one or more of the power sources.

33. The telecommunications and power network of claim 1, wherein:
the network generates a first amount of electrical energy within a period;
the network consumes a second amount of electrical energy within the period; and the first amount of electrical energy is equal to or greater than the second amount of electrical energy.

34. The telecommunications and power network of claim 33, wherein the network generates the first amount of electrical energy from one or more solar cells.

35. The telecommunications and power network of claim 33, wherein the network generates the first amount of electrical energy from one or more renewable energy sources.

36. One or more buildings comprising the telecommunications and power network of claim 1.

37. The one or more buildings of claim 36, wherein one or more of the one or more buildings are under construction, occupied or unoccupied.

\* \* \* \* \*